United States Patent [19]

Nagaoka et al.

[11] 4,127,868

[45] Nov. 28, 1978

[54] CIRCUITRY FOR NONLINEAR PROCESSING OF REFERENCE WHITE ON COLOR IMAGE

[75] Inventors: Yoshitomi Nagaoka, Neyagawa; Tetsuo Tomimoto, Osaka; Reiichi Sasaki, Hirakata, all of Japan

[73] Assignee: Matsushita Electric Industrial Co., Ltd., Osaka, Japan

[21] Appl. No.: 762,188

[22] Filed: Jan. 24, 1977

[30] Foreign Application Priority Data
Feb. 3, 1976 [JP] Japan .................. 51-11027
Sept. 22, 1976 [JP] Japan .................. 51-113923

[51] Int. Cl.² .......................................... H04N 9/535
[52] U.S. Cl. ................................................ 358/29
[58] Field of Search ................ 358/10, 29, 21, 40, 358/64, 65

[56] References Cited

U.S. PATENT DOCUMENTS 3,270,125  8/1966  Kelly et al. .................. 358/10

Primary Examiner—Richard Murray
Attorney, Agent, or Firm—Wenderoth, Lind & Ponack

[57] ABSTRACT

A picture quality improving apparatus for a color television receiver in which red, green and blue system nonlinearities $n_R$, $n_G$ and $n_B$ are similar to each other. The picture quality is improved by so adjusting the values of the three cathode resistances connected to the three cathodes of the picture tube to satisfy the relation $n_B > n_G \geq n_R$.

10 Claims, 12 Drawing Figures

CIRCUITRY FOR NONLINEAR PROCESSING OF REFERENCE WHITE ON COLOR IMAGE

BACKGROUND OF THE INVENTION

1. Field of the Invention

The present invention relates to a picture quality improving apparatus for providing excellent color reproduction and a more subjectively pleasing white on an image of a color television receiver.

2. Description of the Prior Art

In the present day color television receiver, very annoying noise disturbances appear in a high-saturation color portion of a picture such as a saturated red or a saturated blue. In addition to the noise disturbances, the saturated color portions suffer from decreased sharpness and luminance errors. The decreased sharpness gives viewers the same effect as so-called "blooming", which is a lack of sharpness in highlight portions of a picture. The luminance errors are perceived by viewers as extreme enhancements of colors.

As described in the U.S. Pat. No. 3,835,243 the invention of which was made by one of the present inventors, these unwanted disturbances come mainly from the higher correlated color temperature of reference white of a modern color television receiver. It has been made clear that these disturbances can be minimized by optimum design of chrominance demodulators or making the correlated color temperature of reference white rather low such as CIE Illuminant C (6774K) or D65 (6500K). In the United States of America, increasing numbers of TV manufacturers have adopted the lower correlated color temperature for the above reasons. Although the lower color temperature provides excellent reproduction of chromatic colors (fleshtone, red, blue etc.), achromatic colors such as white are made rather nonattractive or not pleasing, as compared with the higher color temperature, because of human preferences. Under existing technology, TV designers must choose one of two alternatives: vivid chromatic colors or clear and pleasing achromatic colors. No means have yet been found which make it possible to reproduce vivid and clear chromatic and achromatic colors simultaneously.

SUMMARY OF THE INVENTION

It is an object of the present invention to provide a picture quality improving means which makes it possible to reproduce vivid chromatic colors and clear achromatic colors simultaneously.

To achieve the foregoing object there is provided a picture quality improving apparatus according to the present invention which comprises a first member which makes the green system nonlinearity equal to or greater than the red system nonlinearity, and a second member which makes the blue system nonlinearity greater than said green system nonlinearity for producing the reference white of a higher correlated color temperature for a higher luminance level of reproduced picture. More specifically, the picture quality improving apparatus according to the present invention comprises a first, a second and a third resistance means receiving a reproduced red primary signal, a reproduced green primary signal and a reproduced blue primary signal, respectively, and being coupled to a first cathode electrode, a second cathode electrode and a third cathode electrode of a color picture tube, respectively, for adjusting the red system nonlinearity $n_R$, the green system nonlinearity $n_G$ and the blue system nonlinearity $n_B$, respectively, the values of the resistances of said first, second and third resistance means being selected to satisfy the relation $n_B > n_G \geq n_R$ at least at a high luminance signal level region.

DESCRIPTION OF DRAWINGS

These and other features of the invention will be apparent from the following description of the invention taken in connection with the accompanying drawings, in which.

DESCRIPTION OF PREFERRED EMBODIMENTS

Figure 1:
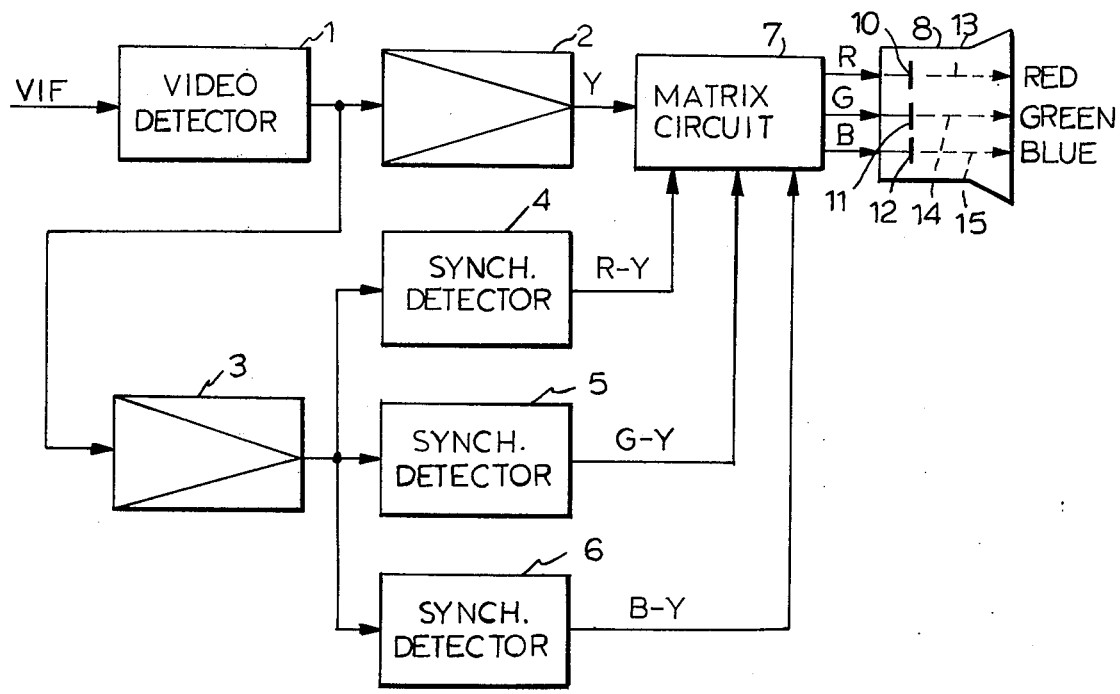
FIG. 1 is a block diagram of a conventional color television receiver.

Referring to FIG. 1, there is shown a block diagram of a conventional color television receiver which receives NTSC television signals. A video detector 1 detects a composite video signal from an intermediate-frequency i-f signal. A luminance signal is separated from said composite video signal and amplified by a video amplifier 2 to produce a luminance signal Y, and fed to a matrix circuit 7. A modulated chrominance signal is separated from said composite video signal, amplified by a bandpass amplifier 3 and fed to synchronous detectors 4, 5 and 6. Said synchronous detectors 4, 5 and 6 demodulate said modulated chrominance signal and take out R-Y, G-Y and B-Y color-difference signals, respectively. Said R-Y, G-Y and B-Y color-difference signals are fed to the matrix circuit 7 and combined with said luminance signal Y fed from said video amplifier 2. Said matrix circuit 7 reproduces primary color signals R, G and B utilizing said color difference signals R-Y, G-Y and B-Y and said luminance signal Y. These primary color signals R, G and B are fed to cathode electrodes 10, 11 and 12 of a color picture tube 8. Said color picture tube 8 produces three electron beams 13, 14 and 15 which hit the red, green and blue phosphor stripes. The phosphors then emit red, green and blue light outputs which give rise to color sensation in the vision of viewers in accordance with the law of additive color mixture.

Many factors exist which affect the quality of color reproduction. The most important factors are the demodulating characteristics of said synchronous detectors 4, 5 and 6, the chromaticities of the red, green and blue phosphors (three primaries) and reference white of the color picture tube 8. The NTSC standard has defined the chromaticities of the three primaries and reference white as follows:

| | | |
|---|---|---|
| red primary | $x = 0.67$, | $y = 0.33$ |
| green primary | $x = 0.21$, | $y = 0.71$ |
| blue primary | $x = 0.14$, | $y = 0.08$ |
| reference white | $x = 0.310$, | $y = 0.316$ |
| | | (Illuminant "C") | where $x$ and $y$ are co-ordinates on the 1931 CIE ($x$, $y$)-chromaticity diagram.

These values are necessary for exact colorimetric reproduction, because the transmitted NTSC signals are optimized for these chromaticities. In addition to these values, the synchronous demodulators 4, 5 and 6 must have the following demodulating axes and gains for exact colorimetric reproduction.

Table 1

| | Axis | Gain |
|---|---|---|
| R-Y | 90° | 1.14 |
| G-Y | 236° | 0.71 |
| B-Y | 0° | 2.04 |

In recent years, the luminous efficiencies of phosphors have been greatly improved, and this has resulted in a change in chromaticities. In addition to chromaticity change of phosphors, modern receivers have reference white of higher color temperature such as 9300K+27MPCD. Therefore, the above mentioned requirements for exact colorimetric reproduction do not stand for modern receivers. In order to reduce colorimetric errors caused by changes of phosphors and reference white, the characteristics of synchronous demodulators have been changed as follows:

Table 2

| | Axis | Gain |
|---|---|---|
| R-Y | 100° | 23.5 |
| G-Y | 236° | 0.75 |
| B-Y | 0° | 2.65 |

It will be found that the demodulating gain of (R-Y) is greatly increased as compared with that of Table 1. Although this increase of demodulating gain is necessary for faithful chromaticity reproduction, it also makes receivers sensitive to noise disturbances, cross-color disturbances and luminance errors contained in the modulated chrominance signal.

There are two ways of solving these problems. One way is to design optimum synchronous demodulators by using nonlinear characteristics, and the other way is to lower the color temperature of reference white. In the United States of America or Europe, it is becoming a general trend to adopt the latter way. The characteristics of synchronous demodulators required for color receivers using modern phosphors and reference white of Illuminant C (6774K) are listed in Table 3.

Table 3

| | Axis | Gain |
|---|---|---|
| R-Y | 89° | 1.55 |
| G-Y | 244° | 0.78 |
| B-Y | 2° | 2.43 |

It will be apparent that the demodulating gain is remarkably reduced as compared with that of Table 2.

As described above, although it is desirable in view of color reproduction to lower the color temperature of reference white, another problem arises. Namely, achromatic colors (such as gray or white) become nonattractive or not pleasing because achromatic colors are reproduced rather reddish as compared with a higher color temperature reference white. Under existing technology, TV designers must take one of the two alternatives: vivid chromatic color reproduction or clear and pleasing achromatic colors. No means have yet been found which make it possible to reproduce clear chromatic and achromatic colors simultaneously.

Recently, a luminance dependence effect of preferred white has been found from investigations of the present inventors. Namely, observer's preference of subjectively pleasing white depends greatly on the luminance level of a reproduced image. The higher the luminance of reproduced image becomes, the higher the color temperature of preferred reference white becomes.

The present invention is based on the above mentioned effect of luminance dependence of preferred white and offers means for achieving compatibility between faithful chromatic reproduction and clear white reproduction.

Figure 2:
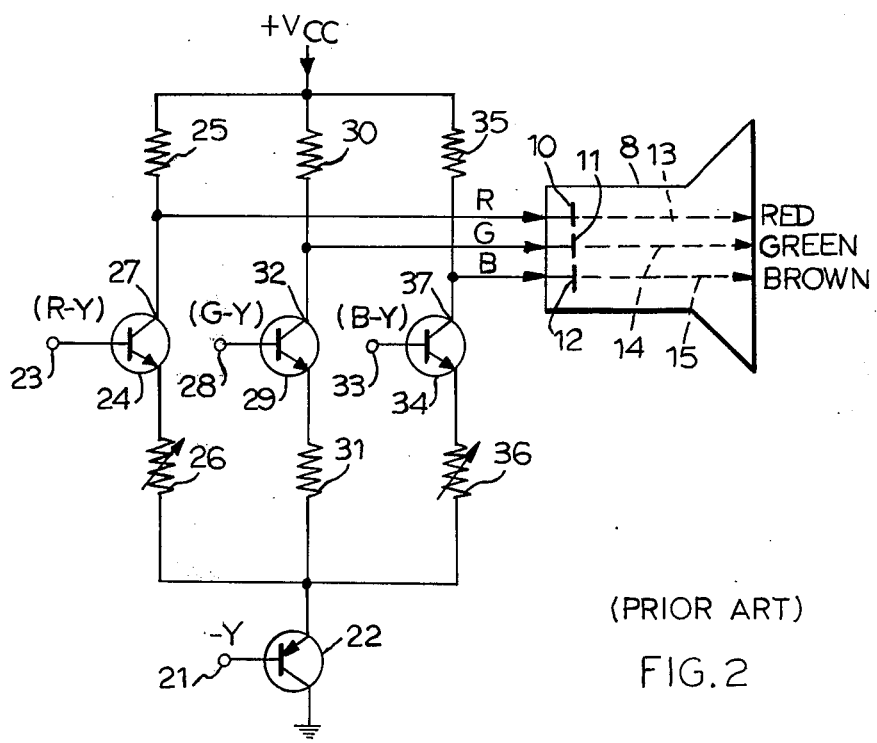
FIG. 2 is a circuit diagram of the matrix circuit 7 of FIG. 1.

FIG. 2 shows a well-known circuit diagram of said matrix circuit 7 of FIG. 1. A transistor 24 amplifies a difference between the negative going luminance signal −Y supplied to the emitter electrode of the transistor 24 through a terminal 21, an emitter follower 22 and a resistor 26, and a color difference signal R−Y, which is supplied to the base electrode of said transistor 24 through a terminal 23. Thus, the red primary signal R is obtained at a collector electrode 27 of said transistor 24. This red primary signal R is fed to the cathode electrode 10 of the color picture tube 8. The gain of said transistor 24 is determined by a ratio of a load resistor 25 to an emitter resistor 26. The same operational principle works for transistor 29 for generating the green primary signal G and transistor 34 for generating the blue primary signal B. Desired chromaticity of reference white is obtained by adjusting the gains of the transistors 24 and 34. The picture tube 8 has nonlinear characteristics which are called gamma. The nonlinear characteristics are divided to two parts. One nonlinearity is beam modulating nonlinearity which is defined as the relation between the beam current and the signal voltage applied to the cathode electrode of an electron gun. That is, the beam current from the electron gun nonlinearly increases as the signal voltage applied to the cathode electrode of the electron gun increases. (Namely, the increase of the beam current is not in a linear proportion to the increase of the signal voltage applied to the cathode electrode.) The other nonlinearity is phosphor nonlinearity which is defined as the relation between the light output and the beam current. That is, the light output from the phosphor struck by the beam current nonlinearly increases as the beam current increases. These nonlinearities have been well investigated, and it has been made clear that a red phosphor comprising rare-earth compounds has almost linear characteristics, and green and blue phosphors comprising sulfide compounds have sublinear characteristics particularly at a high density of beam current.

Due to such nonlinearities, the light outputs generated by the red, green and blue primary signals R, G and B nonlinearly increase as the levels of the red, green and blue primary signals R, G and B increase, respectively. Since each nonlinearity between the increase of each primary signal level and the increase of each light output is caused by various nonlinearities as set forth above, it can be called system nonlinearity. Thus, for the red, green and blue primary signals, the terms "red system nonlinearity", "green system nonlinearity" and "blue system nonlinearity" can be used. Conventionally, it has been believed that the degrees of these red, green and blue system nonlinearities as to the three primary signals R, G and B should be as similar to each other as possible. In the present application, the phosphors are assumed to have linear characteristics for convenience of descriptions.

The beam modulating nonlinearity is expressed in following equation:

$$I = \alpha V_K^\gamma \tag{1}$$

where $I$ is a beam current, $V_K$ is a signal voltage applied to the cathode electrode, $\alpha$ is a proportional constant, and $\gamma$ is a coefficient showing nonlinearity. Although $\alpha$ and $\gamma$ are affected by many factors practically, same values of $\alpha$ and $\gamma$ will be given to red, green and blue electron guns herein for explanation purpose. If resistors 25, 30 and 35 have the same value, the picture tube 8 has the same nonlinearities among red, green and blue colors. Then, complete tracking of white balance is achieved from dark to highlight portions.

Figure 3:
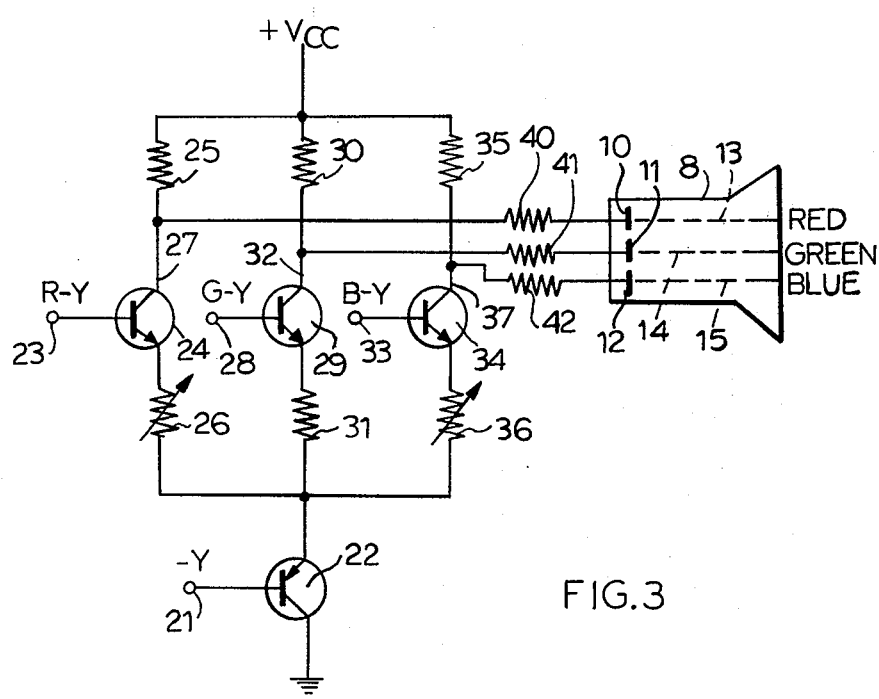
FIG. 3 is a circuit diagram of an example of the picture quality improving apparatus according to the present invention.

FIG. 3 is an example of the picture quality improving apparatus according to the present invention. The same components as those in FIG. 2 are designated by the same reference numerals as those in FIG. 2. In FIG. 3, resistors 40, 41 and 42 are added to FIG. 2. The effect of these resistors will be described below with reference to FIG. 4.

Figure 4:
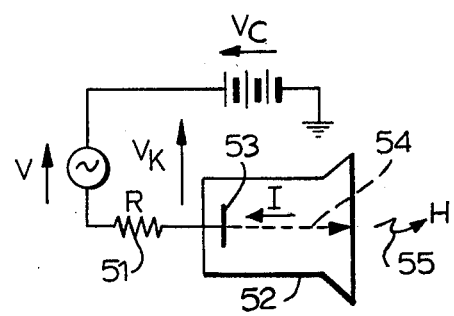
FIG. 4 is a circuit diagram comprising principal components of FIG. 3 for showing a principle of operation of FIG. 3.

FIG. 4 is a circuit diagram comprising principal components of FIG. 3 for showing an operation principle of FIG. 3. A light output 55 is proportional to the beam current 54 of the picture tube 52. The beam current 54 is shown by the following equation as mentioned hereinbefore:

$$I = \alpha V_K^\gamma \tag{2}$$

$V_K$, which is a signal voltage applied to the cathode electrode 53, is expressed as follows:

$$V_K = V - IR \tag{3}$$

$V_c$ in FIG. 4 is a cut off voltage which makes the beam current zero. Combining equations 2 and 3, one obtains the following relation:

$$I = \alpha (V - IR)^\gamma \tag{4}$$

In general, the nonlinearity of the picture tube, which is called gamma, is defined by $n = d(\log I)/d(\log V)$. Some calculation yields the following expression for the system nonlinearity of FIG. 4:

$$n = \frac{d(\log I)}{d(\log V)} = \frac{I^{\frac{1}{\gamma} - 1} + \alpha R}{\frac{1}{\gamma} \cdot I^{\frac{1}{\gamma} - 1} + \alpha R} \tag{5}$$

Equation (5) shows that the system nonlinearity $n$ at $R = 0$ is $\gamma$, which is the beam modulating nonlinearity of the electron gun itself, and that $n$ decreases as R increases. In other words, the system nonlinearity can be controlled by a resistor 51, which is called cathode resistor hereinafter. The larger the cathode resistor becomes, the smaller the system nonlinearity becomes.

Turning back to FIG. 3, the cathode resistors 40, 41 and 42 are inserted between the matrix circuit 7 and the color picture tube. More specifically, the red, green and blue primary signals R, G and B produced from the matrix circuit 7 which receives the luminance signal Y and the color difference signals R−Y, G−Y and B−Y are fed to the red, green and blue cathode electrodes 10, 11 and 12, respectively, through the cathode resistors 40, 41 and 42, respectively. The cathode resistors 40, 41 and 42 play important roles in the embodiment of FIG. 3. The values of the cathode resistors 40, 41 and 42 are set to satisfy the following relation:

$$\text{Resistor } 40 \geq \text{Resistor } 41 > \text{Resistor } 42 \tag{6}$$

Then, a relation among the system nonlinearities, $n_R$, $n_G$ and $n_B$ for red, green and blue colors, respectively, becomes:

$$n_B > n_G \geq n_R \tag{7}$$

Figure 5:
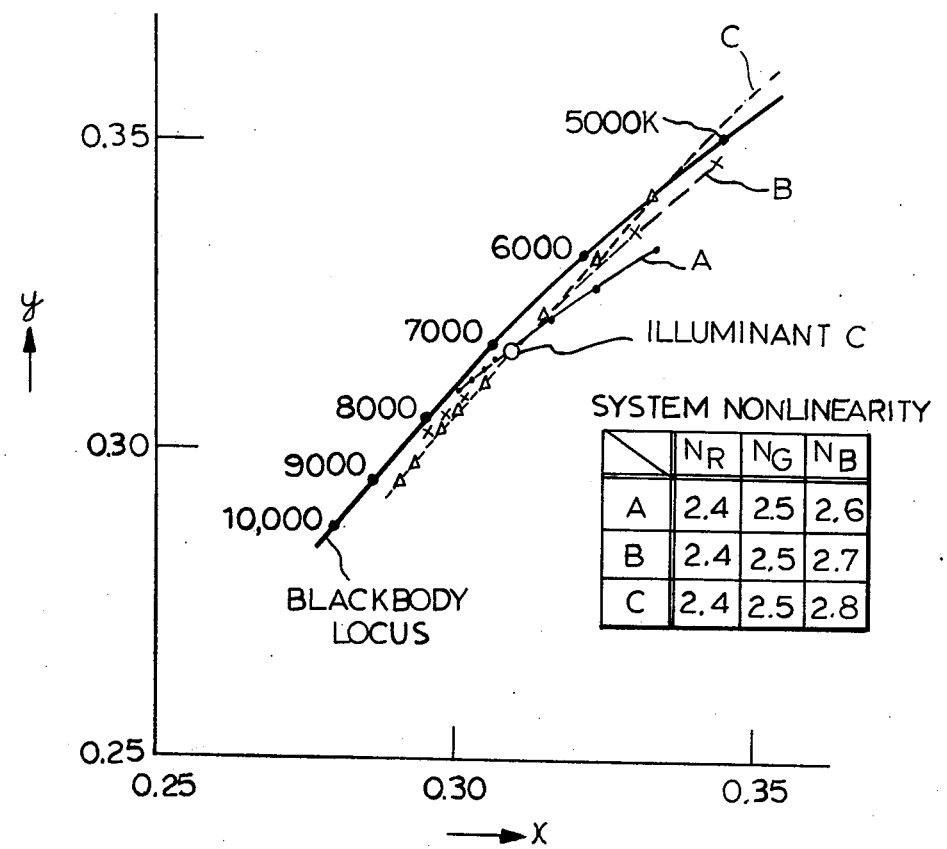
FIG. 5 is a CIE chromaticity diagram showing an effect obtained by the embodiment of FIG. 3.

The relation of equation 7 indicates that the reference white produced on a TV screen changes from reddish or warm white at rather dark portions of a picture to bluish or cool white at rather bright portions. Appropriate design for the system nonlinearities $n_R$, $n_G$ and $n_B$ makes it possible for a locus of chromaticity shift of reference white to go along the blackbody locus on a chromaticity diagram. FIG. 5 shows the loci of the reference white chromaticities according to several combinations of the system nonlinearities.

A color which has a chromaticity around the blackbody locus is perceived by viewers as achromatic from a nature of human color sensation. Therefore, the changes of the reference white chromaticities of FIG. 5 produce a sensation that the color temperature of achromatic colors becomes higher as the luminance level of the reproduced picture increases. The luminance level of the important chromatic colors such as fleshtone, red or blue and so on is rather low as compared with that of the important achromatic colors (white) such as snow, white shirts, white characters and so on. Therefore, the important chromatic colors can be reproduced with rather low color temperature of the reference white, and the important achromatic colors can be reproduced with rather high color temperature of the reference white. The compatibility between a vivid chromatic reproduction and a clear achromatic reproduction can be achieved in this manner.

The embodiment of FIG. 3 has a drawback that the color temperature of the reference white becomes extremely low in very dark portions of a picture as shown in FIG. 5.

Figure 6:
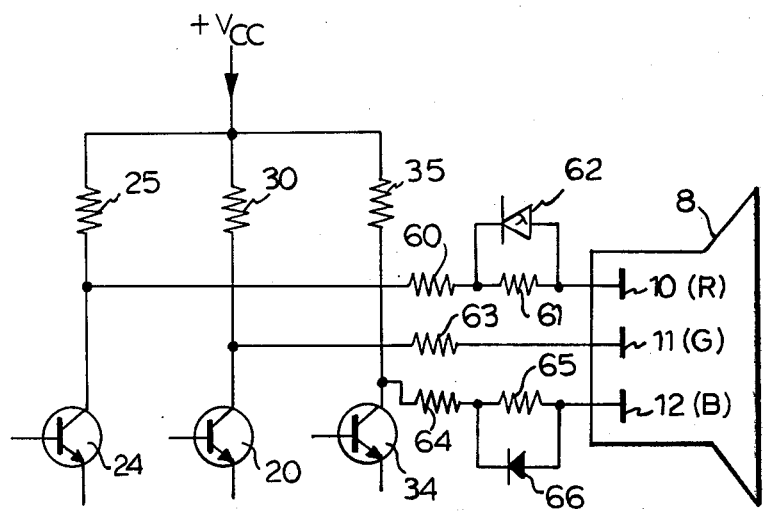
FIG. 6 is a circuit diagram of another example of the picture quality improving apparatus according to the present invention.
Figures 7A, 7B:
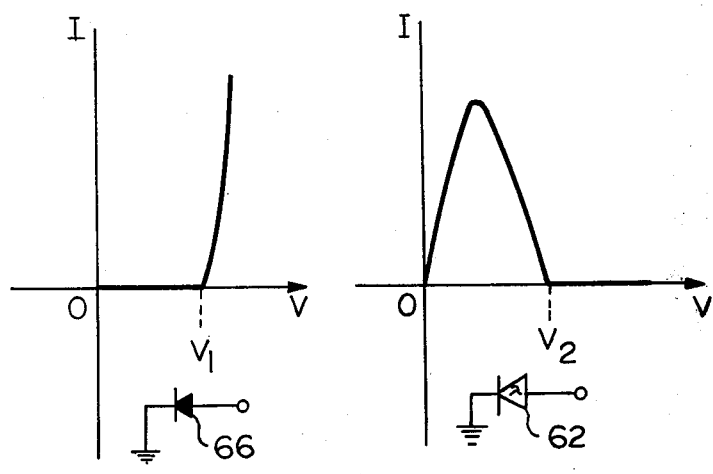
FIG. 7(a) and (b) are voltage-current characteristics of threshold elements employed in the embodiment of FIG. 6.

FIG. 6 is another example of the picture quality improving apparatus according to the present invention overcoming the above drawback of FIG. 3. FIG. 7 shows V-I characteristics of threshold elements 62 and 66 of FIG. 6. FIG. 7(a) shows characteristics of the threshold element 66. When an applied voltage V across the threshold element 66 is smaller than $V_1$, the threshold element 66 is in OFF state. As the voltage V becomes larger than $V_1$, then the threshold element 66 changes to the ON state. On the other hand, the threshold element 62, whose characteristics are shown in FIG. 7(b), is in ON state, when the applied voltage across the threshold element 62 is less than $V_2$. In a range of V greater than $V_2$, the threshold element 62 is in OFF state. A threshold element such as the element 62 is called a "lambda diode".

These threshold elements 62 and 66 are connected to cathode resistors 61 and 65 as shown in FIG. 6. Resistors 60, 63 and 64 are extra cathode resistors for adjusting the system nonlinearities of the three colors. More specifically, the red, green and blue primary signals produced from the matrix circuit which receives the luminance signal and the three color difference signals are fed to the red, green and blue cathode electrodes 10, 11 and 12, respectively, through (a) a series connection of the resistor 60 and the parallel connection of the threshold element 62 and the cathode resistor 61, (b) the resistor 63, and (c) a series connection of the resistor 64 and the parallel connection of the resistor 65 and the threshold element 66, respectively. Values of the resistors 60, 63, 64 and 65 are so chosen as to fulfil the following equation:

Resistor 60 = Resistor 63 = Resistor 64 + Resistor 65.

When each beam current of red, green and blue guns is small, the voltages across resistors 61 and 65 are smaller than $V_2$ and $V_1$, respectively. The threshold element 62 is in ON state and the threshold element 66 is in OFF state in this case. The cathode resistors for red, green and blue are equal to each other because these three cathode resistors are the resistor 60, resistor 63, and the resistor 64 + the resistor 65, respectively. Thus, the system nonlinearities for the respective three colors are equal to each other. In this case, no chromaticity shift is caused by the change of luminance level. If the luminance level of a picture is beyond a predetermined threshold level, respective beam currents flowing through the three electron guns become larger, and the voltages across the resistors 61 and 62 become larger than $V_2$ and $V_1$, respectively. Then, the threshold element 62 turns OFF and the threshold element 66 turns ON. These situations make a relation among three cathode resistors or a relation among three system nonlinearities as follows:

Red cathode resistor > Green cathode resistor > Blue cathode resistor, or:

$n_R < n_G < n_B$

Therefore, at the luminance range of a rather high level, which is larger than a predetermined threshold level, the chromaticity of the reference white is made to move substantially along the blackbody locus as described hereinbefore with reference to FIG. 3. In this manner, undesired chromaticity shift towards a very low color temperature, which may occur in the embodiment of FIG. 3, can be reduced.

Figure 8:
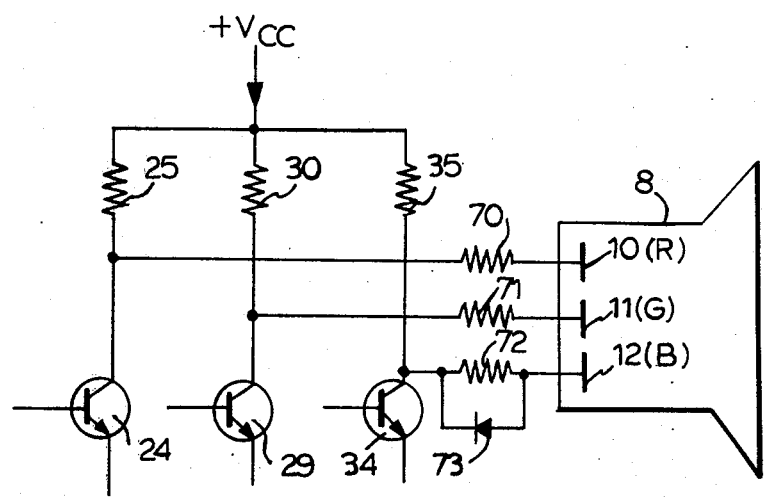
FIG. 8 is a circuit diagram of a further example of the picture quality improving apparatus according to the present invention.
Figure 9:
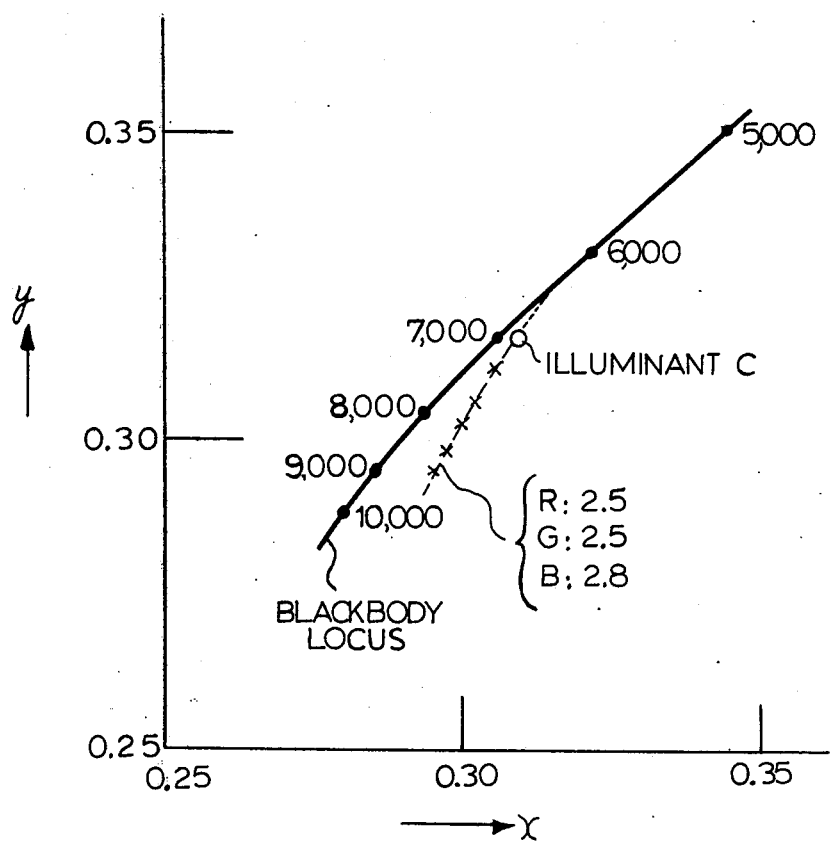
FIG. 9 is a CIE chromaticity diagram showing an effect obtained by the embodiment of FIG. 8.

FIG. 8 shows a circuit diagram of a further example of the picture quality improving apparatus of the present invention. In FIG. 8, the red, green and blue primary signals produced from the matrix circuit which receives the luminance signal and the three color difference signals are fed to the red, green and blue cathode electrodes 10, 11 and 12, respectively, through (a) a resistor 70, (b) a resistor 71, and (c) a parallel connection of a resistor 72 and a threshold element 73, respectively. FIG. 9 is a CIE chromaticity diagram showing an effect obtained by the embodiment of FIG. 8. In FIG. 8, the resistors 70, 71 and 72 are assumed to have the same value. In the luminance range from dark to the predetermined threshold level, at which the threshold element 73 turns ON, no shift of the chromaticity of the reference white is observed because of the same value of the three cathode resistors. At a higher luminance range than the predetermined threshold level, the threshold element 73 turns ON, and the cathode resistance of the blue gun becomes small. Then, the system nonlinearity of the blue color becomes high as compared with that of the red and green. The locus of chromaticity shift of the reference white is shown in a dotted line in FIG. 9. As will be seen from FIG. 9, the dotted line goes substantially along the blackbody locus. This fact indicates that the nonlinear processing for only the blue gun can offer satisfactory result in view of the object of the present invention.

Figure 10:
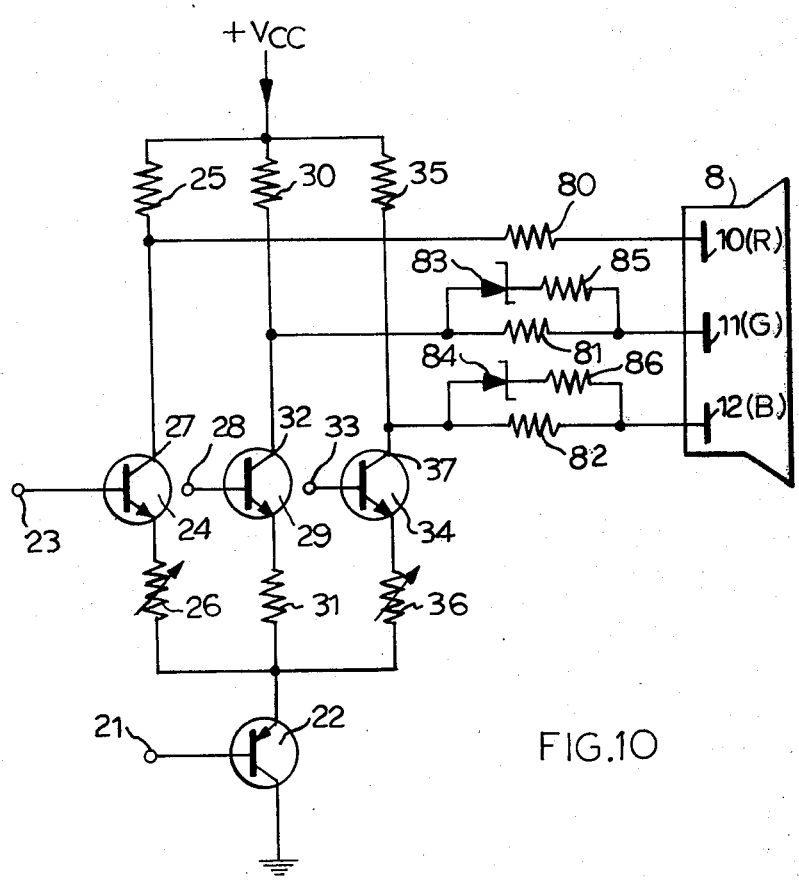
FIG. 10 is a circuit diagram of a still further example of the picture quality improving apparatus according to the present invention.

FIG. 10 shows a circuit diagram of a still further example of the picture quality improving apparatus according to the present invention. In FIG. 10, the red, green and blue primary signals produced from the matrix circuit which receives the luminance signal and the three color difference signals are fed to the red, green and blue cathode electrodes 10, 11 and 12, respectively, through (a) a cathode resistor 80, (b) a parallel connection of a cathode resistor 81 and the series connection of a threshold element 83 and a resistor 85, and (c) a parallel connection of a cathode resistor 82 and the series connection of a threshold element 84 and a resistor 86. It is assumed that the cathode resistors 80, 81 and 82 have the same value. The threshold elements 83 and 84, which are shown as zener diodes in this case, have threshold voltages. These two threshold voltages can be assumed theoretically to have the same value. In practice, these voltages should be adjusted according to the beam current of each gun required for producing desired chromaticity of the reference white at a rather dark luminance level. At a rather dark luminance level, the threshold elements 83 and 84 are in OFF state, and no reference white shift occurs. When the luminance level exceeds the predetermined threshold level, the threshold elements turn ON. Then, the cathode resistances for the green and blue guns become smaller due to parallel connections of resistors 85 and 86. The values of the resistors 85 and 86 are so chosen as to fulfill the following requirement:

Cathode resistance of blue < That of green < That of red With the circuit configuration of FIG. 10, the object of the present invention can be achieved. The zener diode 83, 84 as used in FIG. 10 is interchangeable with the usual diode 66, 73 as used in FIG. 6 and FIG. 8, and vice versa, if the connecting direction of the diode is reversed. No further description is considered to be necessary.

Figure 11:
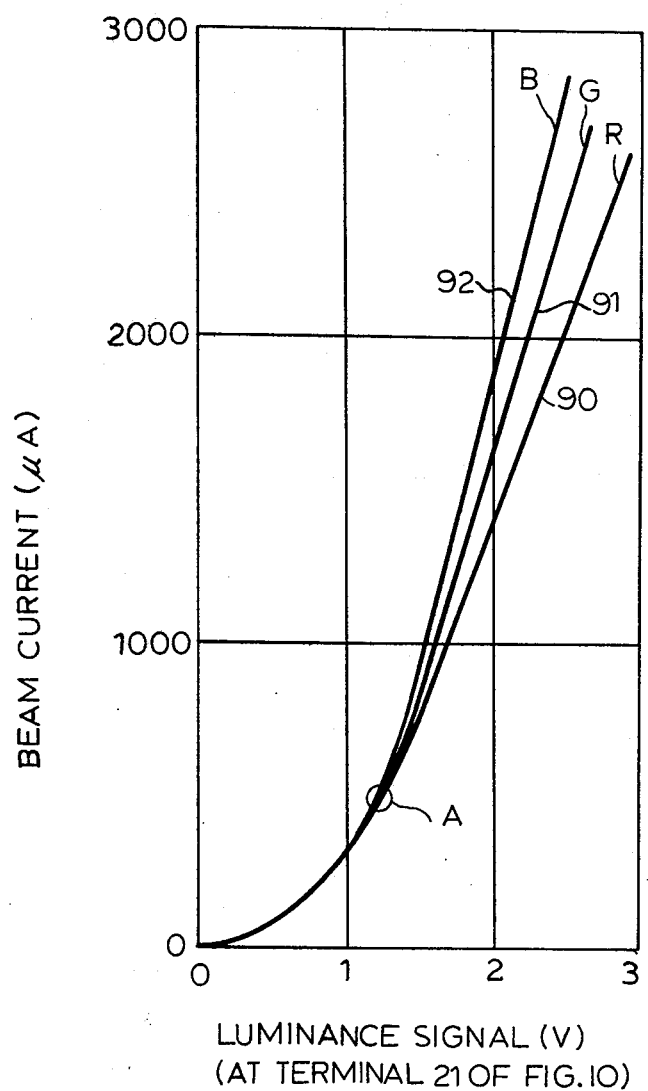
FIG. 11 is a graph showing a relation between the beam current of a color picture tube and the luminance signal voltage, obtained by the embodiment of FIG. 10.

FIG. 11 shows the relation between the beam current of a color picture tube and the luminance signal voltage obtained by the embodiment of FIG. 10. Up to a point designated as A, the system nonlinearities for the three colors are equal to each other, as shown. Beyond the point A, the beam current for blue increases most rapidly as indicated by the curve 92. The beam current for red increases most slowly as indicated by the curve 90. The beam current for green increases at an intermediate rate as indicated by the curve 91.

The embodiment of FIG. 10 has such advantages over the embodiments of FIGS. 6 and 8 in that accurate tracking to the blackbody locus can be achieved with low cost.

Summarizing the examples of the embodiments of the present invention as shown in FIG. 3, FIG. 6, FIG. 8 and FIG. 10, (i) the cathode resistor 40, (ii) the series connection of the resistor 60 and the parallel connection of the threshold element 62 and the resistor 61, (iii) the resistor 70, and (iv) the resistor 80 can commonly be called a first resistance means, operatively coupled between the cathode electrode 10 for the red signal and the matrix circuit, for transferring the reproduced red primary signal to the cathode electrode 10. Similarly, (i) the resistor 41, (ii) the resistor 63, (iii) the resistor 71, and (iv) the parallel connection of the resistor 81 and the series connection of the threshold element 83 and the resistor 85 can be called a second resistance means, operatively coupled between the cathode electrode 11 for the green signal and matrix circuit, for transferring the reproduced green primary signal to the cathode electrode 11. Likewise, (i) the resistor 42, (ii) the series connection of the resistor 64 and the parallel connection of the resistor 65 and the threshold element 66, (iii) the parallel connection of the resistor 72 and the threshold element 73, and (iv) the parallel connection of the resistor 82 and the series connection of the threshold element 84 and the resistor 86 can be called a third resistance means, operatively coupled between the cathode electrode 12 for the blue signal and the matrix circuit, for transferring the reproduced blue primary signal to the cathode electrode 12.

The present invention is not limited to the specific examples of the first, second and third resistance means, but the present invention requires only that the resistances of these three resistance means are selected to satisfy the above described relation between the red, green and blue system nonlinearities $n_R$, $n_G$ and $n_B$: $n_B > n_G \geq n_R$. Thereby, a reference white of increasing correlated color temperature according to an increase of the luminance level of the reproduced picture can be produced. The selection of the resistances of the first, second and third resistance means is easy.

As described in detail hereinbefore, the apparatus according to the present invention provides good compatibility between the excellent reproduction of chromatic colors and the subjectively pleasing reproduction of achromatic colors.

The rather low color temperature of reference white such as D65 or Illuminant C is desirable for rather dark portions of pictures as described. However, the present invention is not restricted to the application for the rather low color temperature of reference white of rather dark portions, but is also applicable for any other color temperatures of reference white if desired. In this case, the appearance of white subjects having a rather high luminance is improved.

Although the phosphors are assumed to have no nonlinearities in the foregoing descriptions, practical phosphors have some nonlinearities as mentioned before. The cathode resistors should be adjusted to compensate for the phosphor nonlinearity, if a more accurate white tracking under the predetermined luminance level is desired.

The descriptions above have been limited to a receiver which receives an NTSC signal.

However, it is apparent from the contents of the present invention that the apparatus of the present invention can be applied for any other color television standards such as PAL or SECAM systems.

It is intended that all matters contained in the foregoing descriptions and in the drawings shall be interpreted as illustrative only, not as limitative, of the invention.

What is claimed is:

1. A picture quality improving apparatus for a color television receiver, comprising:
    a color picture tube having: first, second and third cathode electrodes;
    red primary signal means for reproducing red primary signal;
    first resistance means coupled to said red primary signal means and said first cathode electrode for setting red system nonlinearity $n_R$;
    green primary signal means for reproducing green primary signal;
    second resistance means coupled to said green primary signal means and said second cathode electrode for setting green system nonlinearity $n_G$;
    blue primary signal means for reproducing blue primary signal; and
    third resistance means coupled to said blue primary signal means and said third cathode electrode for setting blue system nonlinearity $n_B$;
    the values of the resistances of said first, second and third resistance means being selected to satisfy the relation $n_B > n_G \geq n_R$.

2. A picture quality improving apparatus according to claim 1, wherein said first, second and third resistance means comprises a first resistor, a second resistor and a third resistor, respectively.

3. A picture quality improving apparatus according to claim 2, wherein the value of said first resistor is at least as great as the value of said second resistor, and the value of said third resistor is smaller than the value of said second resistor.

4. A picture quality improving apparatus according to claim 1, wherein:
    at least one of said first and third resistance means has a first resistance value when the corresponding primary signal is less than a predetermined threshold level and a second resistance value when the corresponding primary signal is higher than the predetermined threshold level, for satisfying said relation $n_B > n_G \geq n_R$ when both of said primary signals are higher than their respective threshold levels.

5. A picture quality improving apparatus according to claim 4, wherein:
    said first resistance means comprises a resistor, and a threshold element which is in an ON state when the voltage signa thereacross is lower than a threshold voltage and is in an OFF state when the voltage thereacross is higher than the threshold voltage, said threshold element being connected in parallel with said resistor, whereby said threshold element is in the ON state when the voltage thereacross is lower than the threshold level of said red primary signal and is in the OFF state when the voltage thereacross is higher than the threshold level of said red primary signal;
    said second resistance means comprises a resistor; and said third resistance means comprises a resistor, and a threshold element which is in an OFF state when the voltage thereacross is lower than a threshold voltage and is in an ON state when the voltage thereacross is higher than the threshold voltage, said threshold element being connected in parallel with said resistor, whereby said threshold element is in the OFF state when the voltage thereacross is lower than the threshold level of said blue primary signal and is in the ON state when the voltage thereacross is higher than the threshold level of said blue primary signal.

6. A picture quality improving apparatus according to claim 5, wherein each of said first and third resistance means further comprises an additional resistor connected in series with said resistor and threshold element connected in parallel.

7. A picture quality improving apparatus according to claim 4, wherein:
said first resistance means comprises a resistor;
said second resistance means comprises a resistor; and
said third resistance means comprises a resistor, and a threshold element which is in an OFF state when the voltage thereacross is lower than a threshold voltage and is in an ON state when the voltage thereacross is higher than a threshold voltage, said threshold element being connected in parallel with said resistor, whereby said threshold element is in the OFF state when the voltage thereacross is lower than the threshold level of said blue primary signal and is in the ON state when the voltage thereacross is higher than the threshold level of said blue primary signal.

8. A picture quality improving apparatus according to claim 7, wherein said third resistance means further comprises an additional resistor connected in series with said resistor and threshold element connected in parallel.

9. A picture quality improving apparatus according to claim 4, wherein:
said first resistance means comprises a resistor, and a threshold element which is in an OFF state when the voltage thereacross is lower than a threshold voltage and is in an ON state when the voltage thereacross is higher than a threshold voltage, said threshold element being connected in parallel with said resistor, whereby the threshold element is in the OFF state when the voltage thereacross is lower than the threshold level of the respective primary signal and is in the ON state when the voltage thereacross is higher than the threshold level of the respective primary signal.

10. A picture quality improving apparatus according to claim 9, wherein each of said second and third resistance means further comprises an additional resistor in series with said threshold element and in parallel with said resistor.

* * * * *